United States Patent [19]

Shinohara

[11] Patent Number: 5,730,377
[45] Date of Patent: Mar. 24, 1998

[54] SPINNING REEL FOR FISHING CAPABLE OF COUNTERACTING FISHING LINE TWIST

[75] Inventor: Eiji Shinohara, Tokyo, Japan

[73] Assignee: Daiwa Seiko, Inc., Tokyo, Japan

[21] Appl. No.: 513,617

[22] Filed: Aug. 10, 1995

[30] Foreign Application Priority Data

Aug. 11, 1994 [JP] Japan .................... 6-189561
Aug. 11, 1994 [JP] Japan .................... 6-189562

[51] Int. Cl.⁶ ............................................ A01K 89/01
[52] U.S. Cl. ............................................ 242/231
[58] Field of Search ................... 242/230, 231, 242/232, 233

[56] References Cited

U.S. PATENT DOCUMENTS

| | | |
|---|---|---|
| 2,728,534 | 12/1955 | Wallace . |
| 3,670,984 | 6/1972 | Lemery . |
| 4,196,868 | 4/1980 | Puryear et al. ............ 242/232 |
| 4,562,976 | 1/1986 | Ban . |
| 4,577,807 | 3/1986 | Urso . |
| 4,767,080 | 8/1988 | Tsunoda et al. . |
| 4,969,613 | 11/1990 | Kaneko . |
| 5,547,139 | 8/1996 | Kaneko . |
| 5,560,561 | 10/1996 | Henriksson . |

FOREIGN PATENT DOCUMENTS

| | | |
|---|---|---|
| 1252667 | 12/1960 | France . |
| 29-16470 | 12/1954 | Japan . |
| 49-30149 | 8/1974 | Japan . |
| 03017661 | 4/1991 | Japan . |
| 4-7178 | 2/1992 | Japan . |
| 4-77771 | 7/1992 | Japan . |
| 4-77772 | 7/1992 | Japan . |
| 6-46467 | 6/1994 | Japan . |
| 94-4769 | 3/1994 | Rep. of Korea . |
| 94-8260 | 12/1994 | Rep. of Korea . |
| 2117611 | 10/1983 | United Kingdom . |

Primary Examiner—Katherine Matecki
Attorney, Agent, or Firm—Sughrue, Mion, Zinn, Macpeak & Seas, PLLC

[57] ABSTRACT

The invention concerns a spinning reel for fishing which is not affected by a diameter of a roll of a wound fishing line, and hence is able to avoid accumulation of twist of a fishing line and entanglement of a fishing line resulting from accumulation of twist of a fishing line, thereby enhancing the handling property of a spinning reel. In the spinning reel for fishing, a support member for supporting a line roller to a rotor is provided with a first control section for controlling a line path from a distal end of a fishing rod to the line roller, and with a second control section for controlling a line path from the line roller to the spool. The first control section is disposed closer to a direction of fishing line winding carried out by the rotor than the second control section. The line roller may be mounted at a fixed, oblique angle either within the support member or relative to a fishing line winding direction or rotor axis.

11 Claims, 15 Drawing Sheets

SPINNING REEL FOR FISHING CAPABLE OF COUNTERACTING FISHING LINE TWIST

BACKGROUND OF THE INVENTION

The present invention relates to a spinning reel for fishing capable of avoiding entanglement of a fishing line and the like in fishing caused by twisting of a fishing line.

As illustrated in FIG. 11, most of conventional spinning reels for fishing have been provided with a half-annular shaped bail 5 at distal ends of a pair of bail support arms 3 provided on a rotor. The bail 5 is designed to be swung through a support member 9 supporting a line roller 7, and a bail holder (not illustrated) either to a side at which a fishing line is to be wound (namely, side A in FIG. 11) or to a side at which a fishing line is to be thrown away (namely, side B in FIG. 11).

By rotating a rotor 1 in a line winding direction (namely, a direction indicated with C in FIG. 11) with a manually operated handle 13 secured to a reel main body 11 with the bail being swung to the line winding side A, a fishing line is wound around a spool 15 making longitudinally traverse movement in response to the rotation of the rotor 1. On the other hand, when a lure is thrown away with the bail 5 being swung to the line throwing side B, a fishing line wound around the spool 15 is fed out in a spiral fashion. In FIG. 11, a reference numeral 17 indicates a leg for attachment integrally formed with the reel main body 11.

It has been long known that a fishing line tends to be twisted while a fishing line is being wound around the spool 15.

That is, as illustrated in FIG. 12, most conventional line rollers 7 have been conventionally formed with a line guide 7a shaped in a cylindrical body having a decreasing diameter from opposite ends to a center thereof, and are supported in a line winding direction of the rotor 1. A fishing line 19 is in general disposed at a center m of the line roller 7 when the line roller 7 is not in rotation.

In operation, the fishline generally twists in one direction when it is paid off from the spool and twists in the opposite direction when it is wound back onto the spool. In the ideal circumstance, the twist imparted by casting should cancel the line twist imparted by the winding operation.

However, various factors encountered during actual operation cause deviations from the ideas and lead to the amount of twist imparted by casting and winding to be unequal. This, in turn, leads to accumulation of twist in the fishline. Some of the factors giving rise to line twist are (a) shifting and bouncing of the fishline on the surface of the line roller and (b) other, lesser factors, such as changes in the fishline tension, imperfections in the fishline, and changes in contact between the fishline and parts of the rod and reel. By way of example, when the fishing line 19 is wound around the spool 15 with the manually operated handle 13, the fishing line having been disposed at the center m of the line roller 7 moves towards a side opposite from the line winding side A, namely towards a direction indicated with D, as shown by two-dotted chain line. The friction between a curved surface of the line roller 7 and the fishing line 19 is greater at a larger diameter of the line roller 7, and hence the fishing line 19 is tend to twist in a direction indicated with E. The direction E is the same direction the twister resulting when the fishing line 19 is fed out of the spool 15.

For this reason, twisting of a fishing line in a common direction caused due to winding and feeding of the fishing line 19 is accumulated in the fishing line 19, which causes entanglement of the fishing line during fishing and finally a break-down of the fishing line after entirety use thereof.

Japanese Utility Model Publication No. 3-17661 has suggested a spinning reel 31 in which a distal end 21a of a bail arm 21 is formed to be 'U' shaped, as illustrated in FIGS. 13 and 14, and the distal end 21a is formed with a control member 29 for displacing a fishing line 27 far away from a center n of the line roller 23 towards a direction in which a fishing line is wound by the rotor 25 (namely, a direction indicated with C in FIG. 14).

However, as illustrated in FIG. 15, a diameter of a roll of the fishing line 27 wound around the spool 33 varies dependently on feeding or winding volume of the fishing line 27.

Also in the spinning reel 31, when the diameter of the roll of the fishing line 27 wound around the spool 33 becomes greater, the fishing line 27 having been disposed at the center of the line roller 23 moves in a direction indicated with an arrow D, as illustrated in FIG. 16. As a result, the fishing line 27 is made to twist in the same direction (namely, a direction indicated with an arrow E) as the direction of the twisting of the fishing line 27, as illustrated in FIG. 12, caused during the fishing line 27 is being fed out.

As mentioned above, it is pointed out that the spinning reel for fishing disclosed in Japanese Utility Model Publication No. 3-17661 has a disadvantage that the spinning reel 31 is affected by the diameter of the roll of the fishing line 27 wound around the spool 33, and hence cannot always accomplish its desired goal.

SUMMARY OF THE INVENTION

The present invention is made in view of the above mentioned problems, and it is an object of the present invention to provide a spinning reel for fishing which is not affected by a diameter of a roll of a wound fishing line, and hence is able to avoid accumulation of twist of a fishing line and entanglement of a fishing line to be caused due to the accumulation of twist of a fishing line, resulting in enhancement of handling property of a spinning reel.

In order to accomplish the above mentioned object, the invention provides a spinning reel for fishing which includes a rotor rotatably attached to a reel main body, a spool carried by the reel main body through a spool shaft so that a fishing line can be wound around the spool by rotating the rotor with a manually operated handle, and a line roller secured to the rotor through a support member for guiding the fishing line to the spool during winding of the fishing line. In the spinning reel for fishing, the support member is provided with a first control section for controlling a line path of the fishing line extending from a distal end of a fishing rod to the line roller, and with a second control section for controlling a line path of the fishing line extending from the line roller to the spool. The first control section is disposed offset from the second control section in a fishing line winding-up direction of the rotor.

In an embodiment, the support member comprises a bail arm secured to a bail support arm provided on the rotor, and a line slider disposed in facing relation to the bail arm for supporting the line roller in cooperation with the bail arm, and the first control section comprises a controller secured to a projection at its distal end, the projection projecting from the bail arm towards the line slider along an axis of the line roller, and a controller secured to a projection at its distal end, the projection being disposed in facing relation to the first mentioned controller and projecting from the line slider towards the bail arm, while the second control section comprises a controller secured to a projection at its distal end, the projection projecting from the line slider towards the bail arm along an axis of the line roller, and a controller secured to a projection at its distal end, the projection being disposed in facing relation to the first mentioned controller and projecting from the bail arm towards the line slider.

In another embodiment, the support member comprises a bail arm secured to a bail support arm provided on the rotor, and a line slider disposed in facing relation to the bail arm for cooperating with the bail arm to support the line roller, and the first control section comprises a controller secured to a projection at its distal end, the projection projecting from the bail arm towards the line slider along an axis of the line roller, and a controller secured to a projection at its distal end, the projection being disposed in facing relation to the first mentioned controller and projecting from the line slider towards the bail arm, while the second control section comprises a controller secured to a projection at its distal end, the projection projecting from the line slider towards the bail arm along an axis of the line roller.

In accordance with the spinning reel for fishing according to the present invention, by rotating the rotor in a line winding direction with the manually operated handle, a fishing line is wound around the spool making the traverse movement. Though the fishing line guided to the line roller attempts to move in a direction opposite from the line winding direction of the rotor as the fishing line is being wound around the spool, the fishing line comes in contact with the first control section on the line slider side, and the movement of the fishing line is limited.

In addition, since the first control section is disposed at a location offset from a location of the second control section in the line winding direction of the rotor, the fishing line comes in oblique contact with a line guide of the line roller.

Accordingly, as the fishing line is wound around the spool, the fishing line being in contact with the line guide of the rotating line roller attempts to move towards the line winding direction of the rotor.

However, since the first and second control sections come in contact with the fishing line and hence restrict the movement of the fishing line, the fishing line is wound around the spool with the fishing line being twisted due to a counter-force. The twist caused in this winding of the fishing line is just in an opposite direction to a direction of the line twist caused when the fishing line is thrown away (i.e., when it is released during costing).

As a diameter of a roll of a fishing line wound around the spool becomes greater by winding a fishing line around a spool, the fishing line which attempts to move towards the line winding direction of the rotor receives a force for moving the fishing line in an opposite direction from the line winding direction of the rotor. However, the first and/or second control sections on the bail arm side come in contact with the fishing line, and thereby restrict the movement of the fishing line.

Accordingly, while the fishing line is being wound, the fishing line is controlled by the first and second control sections to thereby be always placed in a predetermined position of the line roller. In addition, line twisting occurs in a direction opposite from a direction of the line twisting which occurs when the fishing line is thrown away, and the fishing line is wound around the spool under such a condition.

Thus, the line twisting of the fishing line wound around the spool is eliminated by being canceled with the line twisting which is to occur when the fishing line is thrown away.

The invention further provides a spinning reel for fishing which includes a rotor rotatably attached to a reel main body, a spool carried by the reel main body through a spool shaft so that a fishing line is wound around the spool by rotating the rotor with a manually operated handle, and a line roller secured to the rotor through a support member for guiding the fishing line to the spool during winding the fishing line. In the spinning reel for fishing, the line roller is mounted on the support member and inclined with respect to the fishing line winding-up direction such that an end of the line roller at a side of the fishing line winding direction of the rotor is closer to a distal end of a fishing rod than the other end; and a controller for restricting movement of the fishing line in the axial direction of the line roller is provided on the support member.

In an embodiment, a fishing line guide portion of the line roller is formed into a cylindrical configuration, and the line roller is rotatably mounted on the support member.

In accordance with the spinning reel for fishing of the present invention, by rotating the rotor in the line winding direction with the manually operated handle, the fishing line is wound around the spool making the traverse movement.

At this time, the controller controls the fishing line guided to the fishing line guide portion of the line roller so as to restrict the movement of the fishing line in the axial direction of the line roller, and the line roller, by the virtue of the guiding effect of its inclined fishing line guide portion, produces the twist onto the fishing line in the direction opposite from the direction of the line twist to be produced at the time when the fishing line is fed out. Thus, this line twist on the fishing line will disappear by being canceled by the line twist caused by casting.

As a diameter of a roll of a fishing line wound around the spool becomes greater by winding a fishing line around a spool, a force for moving the fishing line in a direction opposite from the distal end of the fishing rod or from the line winding direction of the rotor exerted on the fishing line, which attempts to move towards the line winding direction of the rotor. However, the controller restricts the movement of the fishing line while contacting therewith. Further, by the virtue of the guiding effect of the inclined fishing line guide portion of the line roller, the line twist is produced in the direction opposite from the direction of the line twist which will occur when the fishing line is fed out.

Therefore, it is possible to prevent the formation of the line twist in the same direction as that produced when the fishing line is fed out even though the line winding diameter on the spool varies, and no adverse effect is caused regardless of the variation of the line winding diameter.

Also, according to the spinning reel for fishing of the invention, the fishing line guided to the fishing line guide portion of the line roller attempts to move in the fishing line winding direction of the rotor due to the inclined arrangement of the line roller in conjunction with the rotation of the line roller. However, the fishing line is brought into contact with the controller and is restricted thereby, so that the line twist is surely produced in the direction opposite from the line twist to be caused when the fishing line is fed out. Thus, this line twist on the fishing line disappears by being canceled by the line twist occurring during casting.

As described above, a spinning reel for fishing according to the present invention generally comprises: a rotor rotatably arranged with respect to a reel main body; a spool supported on the reel main body so that a fishing line can be wound around the spool by rotating the rotor in a fishing line winding-up direction; and a line roller supported on the rotor through a support member for guiding the fishing line from a distal end of a fishing rod to the spool during an operation for winding the fishing line, the line roller having a first end and a second end opposite from the first end with respect to the fishing line winding-up direction, and is characterized in that the fishing reel further comprises means for inclinably contacting the fishing line with the line roller so that the fishing line is introduced to a first portion of the line roller and apart from a second portion of the line roller, the second portion being closer to the first end than the first portion; and the means includes at least one of: (1) a combination of a pair of first and second controllers, the first controller projecting from a proximity of the first end toward the second end along an axis of the line roller for restricting movement of the fishing line extending from the distal end of the fishing rod to the line roller while contacting the fishing line, the controller projecting from a proximity of the second end toward the first end along an axis of the line roller for restricting movement of the fishing line extending from the line roller to the spool while contacting the fishing line, and a distal end of the first controller being closer to the second end than a distal end of the second controller; and (2) a support shaft provided on the support member for supporting the support member in such an inclined manner with respect to the fishing line winding-up direction that the second end is closer to the distal end of the fishing rod than the first end.

DETAILED DESCRIPTION OF THE PREFERRED EMBODIMENTS

Hereinbelow will be in detail described embodiments in accordance with the invention with reference to the drawings.

Figure 1:
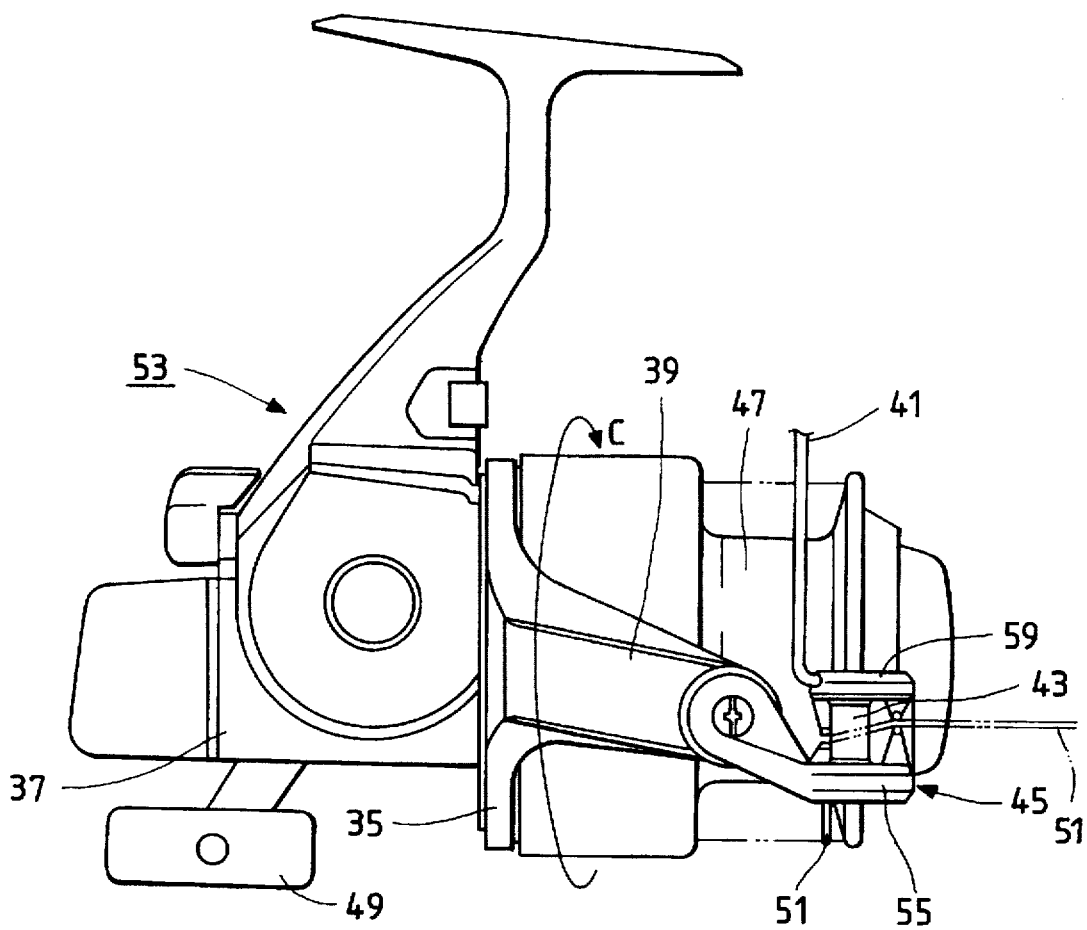
FIG. 1 is a side view of a spinning reel for fishing in accordance with a first embodiment of the present invention.
Figure 2:
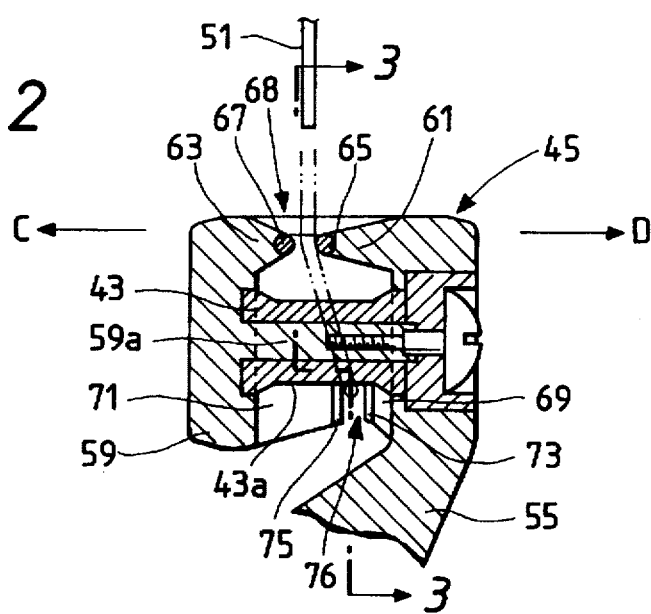
FIG. 2 is a cross-sectional view of the spinning reel for fishing illustrated in FIG. 1.
Figure 3:
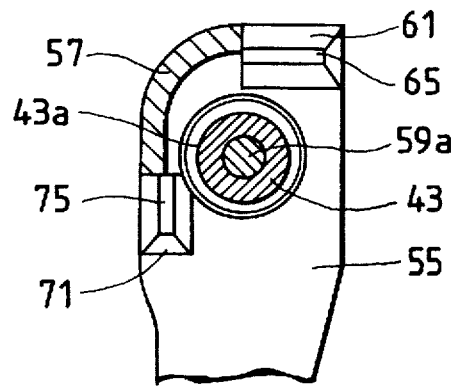
FIG. 3 is a cross-sectional view taken along the line 3—3 of FIG. 2.

FIGS. 1 to 3 illustrate a spinning reel for fishing according to a first embodiment of the present invention. In FIG. 1, a reference numeral 35 indicates a rotor rotatably mounted on a reel main body 37. The rotor 35 is integrally formed with a pair of bail support arms 39 projecting towards a distal end of a fishing rod. To the bail support arms 39 at their distal ends is secured a half-annular shaped bail 41 through a bail holder (not illustrated) and a support member 45 for supporting a line roller 43 so that the bail 41 can be swung to a side for winding a fishing line and also to a side for throwing away a fishing line.

A reference numeral 47 indicates a spool supported coaxially with respect to the rotor 35. The spool 47 is carried by a spool shaft (not illustrated) secured to the reel main body 37 so that the spool shaft can make a traverse movement. Similarly to a conventional spool, by swinging the bail 41 to the line winding side and rotating the rotor 35 in a line winding direction (namely, a direction indicated with an arrow C in FIG. 1) with a manually operated handle 49, a fishing line 51 is wound around the spool 47 making a traverse movement in response to the rotation of the rotor 35.

A spinning reel 53 in accordance with the embodiment has the following features in addition to the structure of the conventional reel as mentioned above.

The support member 45 for supporting the line roller 43 comprises a bail arm 55 swingably secured to the bail support arm at its distal end, and a line slider 59 having a T-shaped cross-section and integral with the bail arm 55 through a line cover 57, as illustrated in FIGS. 2 and 3. A shank portion 59a of the line slider 59 is fixedly secured to the bail arm 55 with a bolt. To the shank portion 59a is rotatably supported the line roller 43 including a line guide portion 43a having a cylindrical body except at opposite ends thereof.

As illustrated in FIGS. 2 and 3, each of the bail arm 55 and the line slider 59 is integrally formed with projections 61 and 63, respectively, which are located at their distal ends and extend along a longitudinal axis of the line roller 43. The projections 61 and 63 have a substantially triangle cross-section, and are in facing relation to each other. The projection 61 of the bail arm 55 projects towards the line slider 59, passing across the axial center of the line roller 43. To each of tip ends of the projections 61 and 63 is secured cylindrically shaped or rod-like controllers 65 and 67, respectively, each made of ceramics so that the controllers are in parallel with each other. These controllers 65 and 67 work as a first control section 68 which controls a line path through which a fishing line 51 is to be guided from a distal end of a fishing rod to the line roller 43 while the fishing line 51 is being wound up.

In addition, the bail arm 55 and the line slider 59 are integrally formed with projections 69 and 71, respectively, which are located at a diametrically opposite side to the projections 61 and 63 with respect to the line roller 43 and extend along a longitudinal axis of the line roller 43. The projections 69 and 71 have a substantially triangle cross-section, and are in facing relation to each other. The projection 71 of the line slider 59 projects towards the bail arm 55, passing across the axial center of the line roller 43. To each of tip ends of the projections 69 and 71 is secured cylindrically shaped or rod-like controllers 73 and 75, respectively, each made of the same material as that of the controllers 65 and 67. These controllers 73 and 75 work as a second control section 76 which controls a line path through which the fishing line 51 is to be guided from the line roller 43 to the spool 47 while the fishing line 51 is being wound up.

Accordingly, as illustrated in FIG. 2, the first control section 68 is disposed closer to the line winding direction of the rotor 35 (namely, a direction indicated with an arrow C in FIG. 2) than the second control section 76. That is, the first control section 68 is offset toward the left-hand side in FIG. 2 relative to the second control section 76.

A line roller is in general composed of hard material such as various ceramics and copper alloy to which hard plating is applied. The line roller 43 in the embodiment is also composed of such hard material. The controllers 65, 67, 73 and 75 may be selectively composed of various hard materials such as copper alloy to which hard plating is applied, aluminum to which hard alumite or hard plating is applied, and stainless steel to which ion plating is applied, as well as ceramics. However, the material of which the controllers are made is not to be limited to those.

In the embodiment having the above mentioned structure, when a lure or terminal hook device is thrown away with the bail 41 being swung to the line throwing side, the fishing line 51 wound around the spool 47 is fed out in a spiral way. Then, by swinging the bail 41 to the line winding side, the fishing line 51 is guided to the line roller 43 through the projections 61, 63, 69 and 71.

Then, by handling the manual handle 49 to wind the fishing line 51 up, the fishing line 51 is wound around the spool 47 making a traverse movement in response to the winding up of the fishing line. During this operation, though the fishing line 51 tends to move towards a side (namely, a direction indicated with an arrow D in FIG. 2) opposite from the line winding direction of the rotor 35, the controller 65 comes in contact with the fishing line 51 guided by the line roller 43, and restricts such movement of the fishing line.

Figure 4:
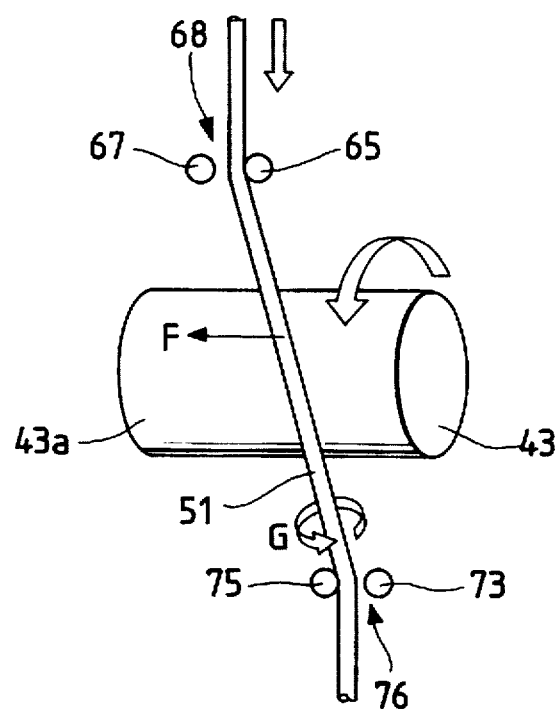
FIG. 4 is an explanatory view for showing the reason why a fishing line is twisted.

In addition, since the first control section 68 is disposed offset from the second control section 76 in the line winding direction (i.e. the arrow C direction) of the rotor 35 in the embodiment, the fishing line 51 comes in oblique contact with the line guide 43a of the line roller 43, as illustrated in FIG. 4.

Accordingly, as the fishing line 51 is wound around the spool 47, the fishing line 51 in contact with the line guide 43a of the rotating line roller 43 attempts to move in a direction indicated with an arrow F in FIG. 4, that is, in a direction towards the line slider 59.

However, the controllers 67 and 75 of the first and second control sections 68 and 76 come in contact with the fishing line 51, and thereby restrict the movement of the fishing line in a direction indicated with an arrow F. Thus, a counterforce causes the fishing line 51 to be twisted in a direction indicated with an arrow G, and the fishing line 51 is wound around the spool 47 under such a condition.

Figure 12:
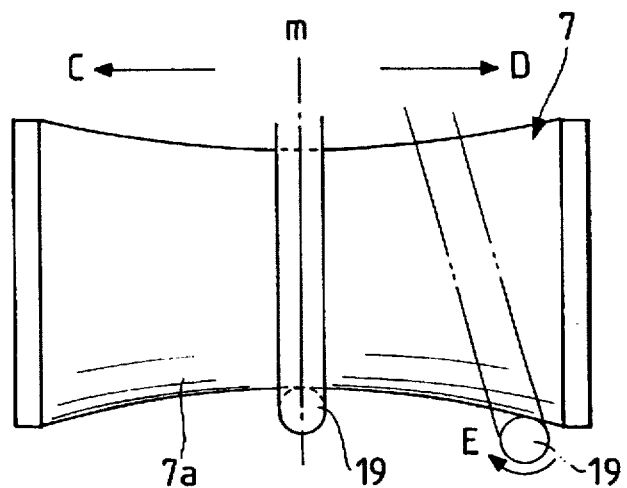
FIG. 12 is an explanatory view for showing a movement of a fishing line when the fishing line is wound up, and a direction in which the fishing line is twisted.
Figure 13:
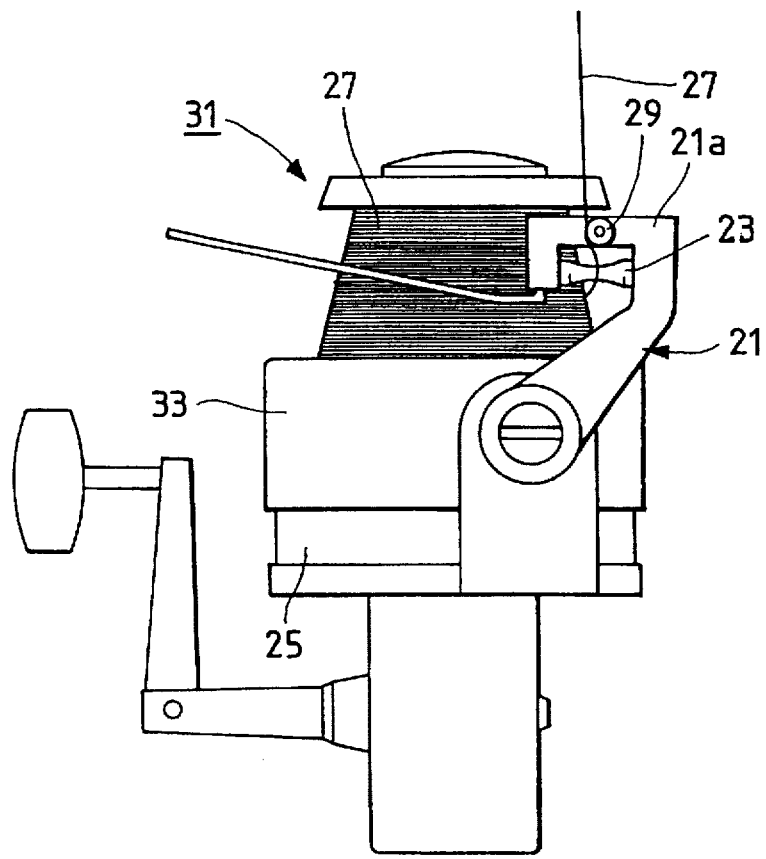
FIG. 13 is a side view of another conventional spinning reel for fishing.
Figure 14:
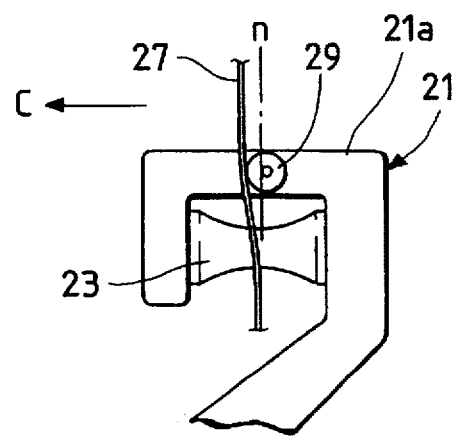
FIG. 14 is an enlarged view of the spinning reel for fishing illustrated in FIG. 13.
Figure 15:
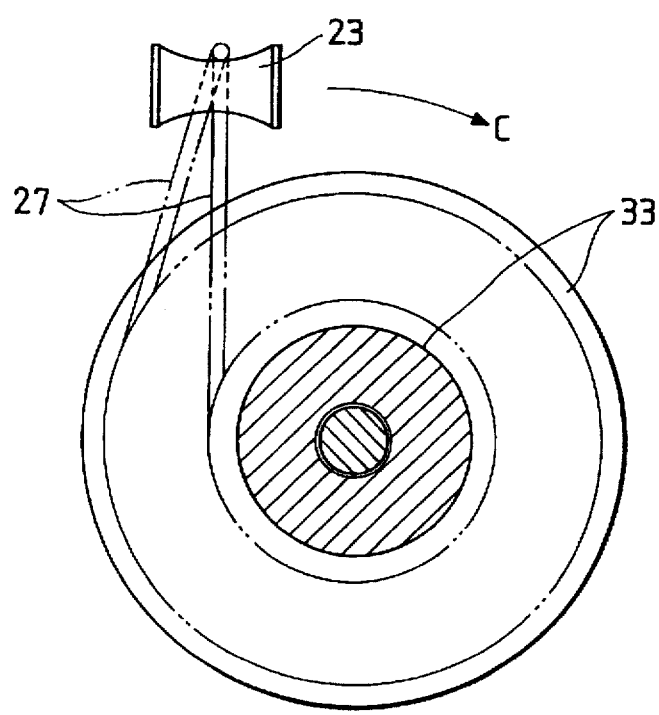
FIG. 15 is an explanatory view for showing how a diameter of a roll of wound fishing line varies.
Figure 16:
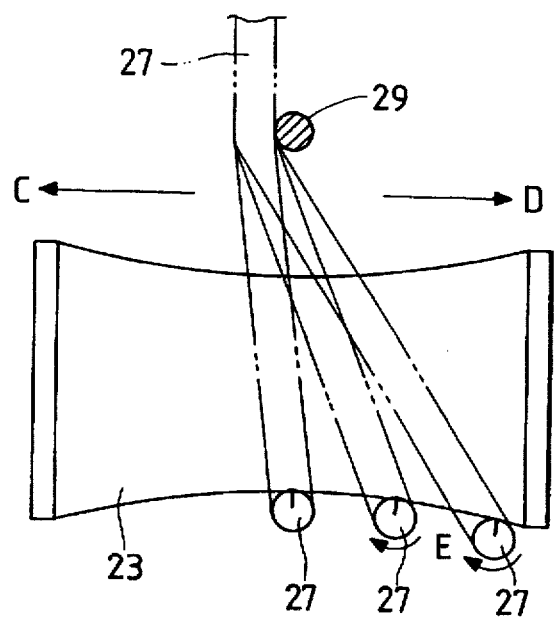
FIG. 16 is an explanatory view for showing a movement of a fishing line which is to occur when a diameter of a roll of wound fishing line varies, and a direction in which the fishing line is twisted.

The line twist in a direction indicated with an arrow G is just opposite from a direction of the line twist (namely, a direction indicated with an arrow E in FIG. 12) to be caused when the fishing line is thrown away.

As a diameter of a roll of the fishing line wound around the spool 47 becomes greater by winding the fishing line 51 around the spool, the fishing line which attempts to move in the direction indicated with an arrow F receives a force for moving the fishing line 51 in a direction indicated with an arrow D. However, the controllers 65 and 73 of the first and second control sections 68 and 73 come in contact with the fishing line 51, and thereby restrict the movement of the fishing line in a direction indicated with an arrow D.

Accordingly, while the fishing line is being wound, the fishing line 51 is controlled by the first and second control sections 68 and 76 to thereby be always placed in a predetermined position of the line roller 43. In addition, line twist occurs in a direction (namely, a direction indicated with an arrow G) opposite to a direction of the line twist (namely, a direction indicated with an arrow E in FIG. 12) which occurs when the fishing line is to be thrown away, and the fishing line is wound around the spool 47 under such a condition.

Thus, the line twist of the fishing line 51 wound around the spool 47 is eliminated by being canceled with the line twist which occurs when the fishing line is thrown away.

As it has been described so far, the embodiment resolves the problems of the conventional spinning reel for fishing as illustrated in FIGS. 11 to 16, and causes the fishing line 51, without being influenced by a diameter of a roll of the wound fishing line, to have the line twist in a direction opposite to a direction of the line twist which occurs when the fishing line is to be thrown away. Thus, line twist is never accumulated in the fishing line 51.

Thus, in accordance with the present embodiment, entanglement of the fishing line caused due to twisting of the fishing line 51 does not occur, and there is no problem that the fishing line 51 breaks down due to a long use thereof, resulting in much enhancement of practicality of the spinning reel for fishing.

In addition, in the present embodiment, the first and second control sections 68 and 76 restrict movement of the fishing line 51 even if a diameter of a roll of the fishing line 51 wound around the spool 47 varies between greater or smaller diameters, and thus the fishing line 51 is not loose on the line roller 43.

Figure 5:
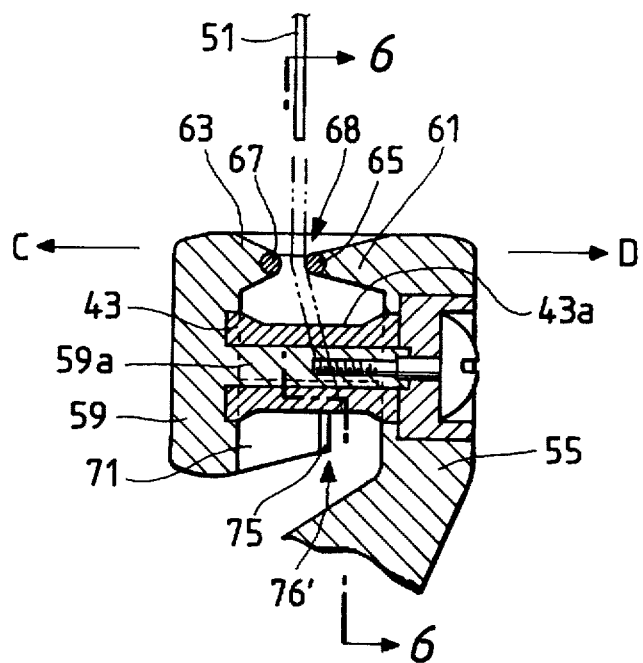
FIG. 5 is a cross-sectional view of a spinning reel for fishing in accordance with a second embodiment of the present invention.
Figure 6:
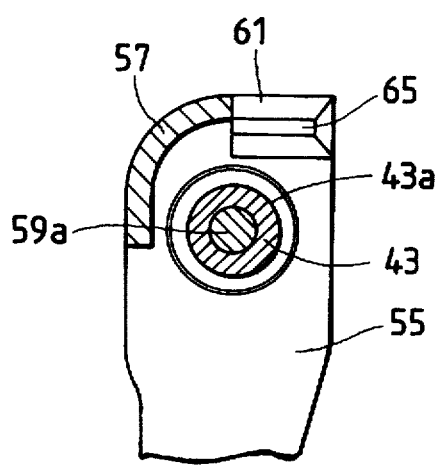
FIG. 6 is a cross-sectional view taken along the line 6—6 of FIG. 5.

FIGS. 5 and 6 illustrate a spinning reel for fishing in accordance with a second embodiment of the present invention. In the above described first embodiment, the second control section 76 comprises the controllers 73 and 75 fixedly secured to the projections 69 and 71 formed with the bail arm 55 and the line slider 59, respectively. In this embodiment, the projection 69 and the controller 73 are not provided, and hence the controller 75 above constitutes a second control section 76'.

This embodiment has the same structure as that of the above mentioned embodiment except for the second control section, and hence the same parts as those of the above mentioned embodiment have been provided with the same reference numerals and will not be explained.

In the embodiment, as a diameter of a roll of the fishing line 51 wound around the spool 47 becomes greater by winding the fishing line 51 around the spool, the fishing line 51, which attempts to move towards the line slider 59 (namely, in a direction indicated with an arrow F in FIG. 4), receives a force for moving the fishing line 51 in a direction indicated with an arrow D. However, the controller 65 of the first control section 68 comes in contact with the fishing line 51, and thereby restricts the movement of the fishing line in a direction indicated with an arrow D. Even if the fishing line 51 in contact with the line guide 43a of the line roller 43 is moved in a direction indicated with an arrow D, the fishing line 51 finally moves towards the line slider 59 (namely, in a direction indicated with an arrow F in FIG. 4) along the line guide 43a.

Then, since the controllers 67 and 75 of the first and second control sections 68 and 76' come in contact with the fishing line 51 and thereby restrict the movement of the fishing line 51, a counter-force causes the fishing line 51 to have the line twist in a direction (namely, a direction indicated with an arrow G) opposite from a direction of the line twist (namely, a direction indicated with an arrow E in FIG. 12) which occurs when the fishing line is to be thrown away, similarly to the above mentioned embodiments.

As having been described so far, even if the controller 73 disposed at the side of the bail arm 55 in FIG. 1 is omitted, it is possible to cause the fishing line 51, without being influenced by a diameter of a roll of the wound fishing line, to have the line twist in a direction opposite to a direction of the line twist which occurs when the fishing line is to be thrown away.

Thus, in accordance with the present embodiment, entanglement of the fishing line caused due to twisting of the fishing line 51, does not occur and there is no problem that the fishing line 51 breaks down due to a long use thereof, resulting in enhancement of practicality of the spinning reel for fishing.

Figure 7:
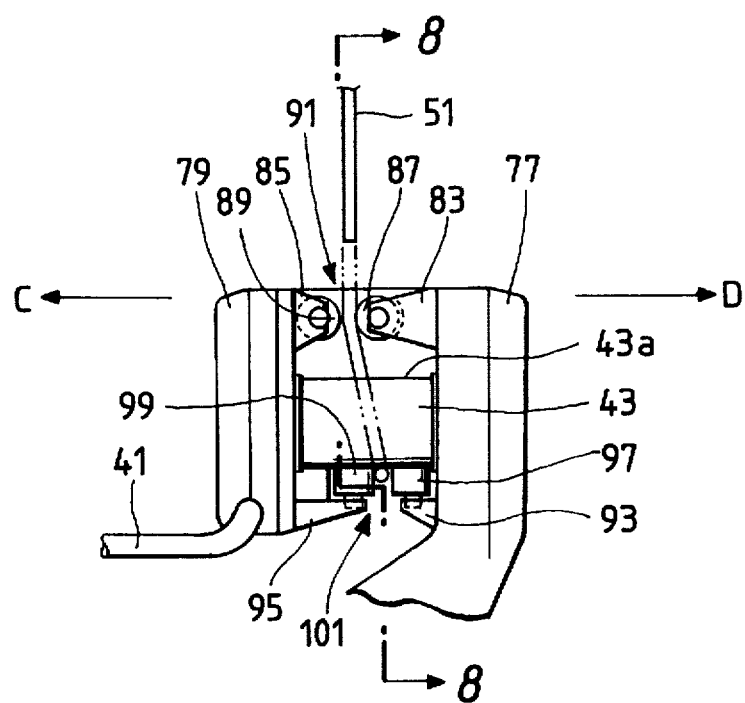
FIG. 7 is a plan view of a spinning reel for fishing in accordance with a third embodiment of the present invention.
Figure 8:
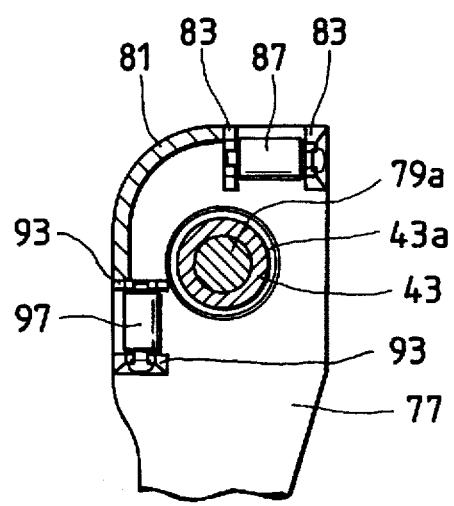
FIG. 8 is a cross-sectional view taken along the line 8—8 of FIG. 7.

FIGS. 7 and 8 illustrate a spinning reel for fishing in accordance with a third embodiment of the present invention.

This embodiment has the same structure as the embodiment illustrated in FIG. 1 except the inventive structure. Accordingly, hereinbelow will be described only the inventive structure. The same parts as those of the above mentioned embodiment have been provided with the same reference numerals and will not be explained.

In FIG. 7, a reference numeral 77 indicates a bail arm, which is similar to the bail arm 55, secured to the bail support arm 39 at its distal end, and a reference numeral 79 indicates a line slider having a T-shaped cross-section and integral with the bail arm 77 through a line cover 81. The line roller 43 is rotatably carried at a shank portion 79a of the line slider secured to the bail arm 77 by means of a bolt.

In the present embodiment, each of the bail arm 77 and the line slider 79 is integrally formed with roller supporting projections 83 and 85, respectively, in place of the projections 61, 63, 69 and 71 and the controllers 65, 67, 73 and 75 of the embodiment illustrated in FIG. 1, the supporting projections 83 and 85 being located at their distal ends and extending along a longitudinal axis of the line roller 43. The roller supporting projections 83 and 85 have a substantially triangle cross-section, and are in facing relation with each other. The roller supporting projections 83 of the bail arm 77 project to an axial center of the line roller 43. Between tip ends of the roller supporting projections 83 and 85 are rotatably supported rollers 87 and 89, respectively. These rollers 87 and 89 work as a first control section 91 which controls a line path through which the fishing line 51 is to be guided from a distal end of a fishing rod to the line roller 43 while the fishing line 51 is being wound up.

In addition, each of the bail arm 77 and the line slider 79 is integrally formed at an opposite side to the roller supporting projections 83 and 85 with respect to the line roller 43 with roller supporting projections 93 and 95, respectively, along a longitudinal axis of the line roller 43. The roller supporting projections 93 and 95 have a substantially triangle cross-section, and are in facing relation with each other. The roller supporting projection 95 of the line slider 79 projects to a center of the line roller 43. Between tip ends of the roller supporting projections 93 and 95 are rotatably supported rollers 97 and 99, respectively. These rollers 97 and 99 work as a second control section 101 which controls a line path through which the fishing line 51 is to be guided from the line roller 43 to the spool 47 while the fishing line 51 is being wound up. The first control section 91 is disposed closer to the line winding direction of the rotor 35 than the second control section 101.

Thus, the present embodiment is able to accomplish the desired object, similarly to the embodiment illustrated in FIG. 1. Since the embodiment uses the rotatable rollers 87, 89, 97 and 99 as the controllers of the first and second control sections 91 and 101, the embodiment makes it possible to guide the line roller 43 and the spool 47 without imposing excessive load to the fishing line 51 relative to the above mentioned embodiments.

Accordingly, the embodiment has an advantage relative to the above mentioned embodiments that the embodiment provides a better countermeasure against the line twist.

Figure 9:
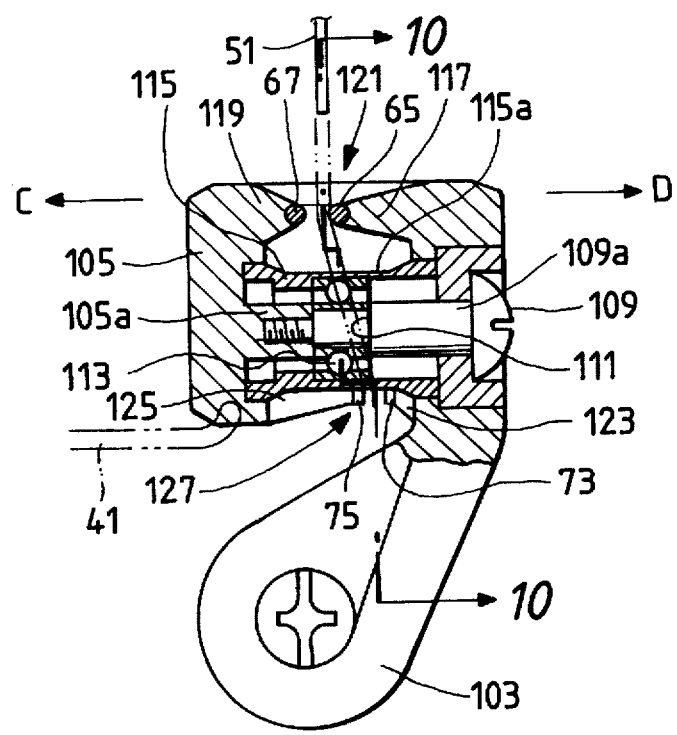
FIG. 9 is a cross-sectional view of a spinning reel for fishing in accordance with a fourth embodiment of the present invention.
Figure 10:
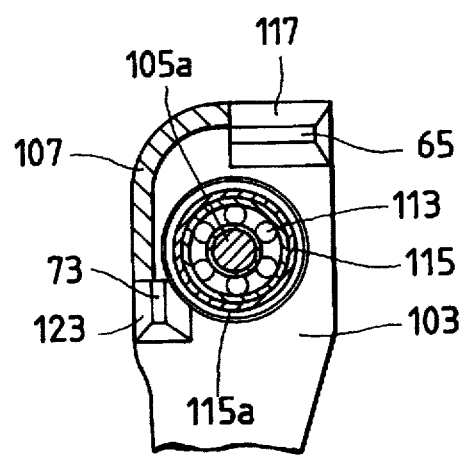
FIG. 10 is a cross-sectional view taken along the line 10—10 of FIG. 9.
Figure 11:
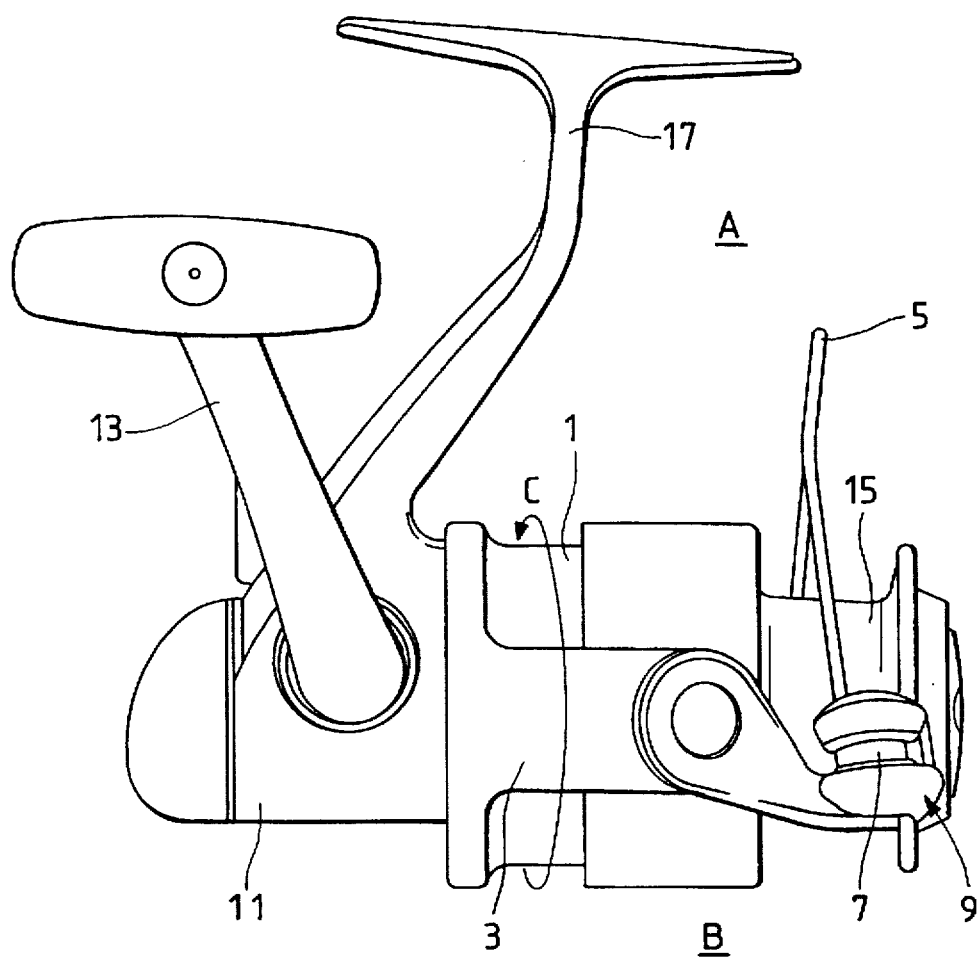
FIG. 11 is a side view of a conventional spinning reel for fishing.

FIGS. 9 and 10 illustrate a spinning reel for fishing in accordance with a fourth embodiment of the present invention. In this embodiment, the line roller is rotatably supported by using a ball bearing.

Hereinbelow will be explained the embodiment with reference to the drawings. Parts which are the same as those of the above mentioned embodiments have been provided with the same reference numerals, and thereby will not be explained.

In FIGS. 9 and 10, a reference numeral 103 indicates a bail arm secured to the bail support arm 39 at its distal end, and a reference numeral 105 indicates a line slider integral with the bail arm 103 through a line cover 107. The line slider 105 is formed with a shank portion 105a shorter than the shank portion 59a of the above mentioned line slider 59. The shank portion 105a is secured to the bail arm 103 by means of a bolt 109 secured to the bail arm 103 coaxially with the shank portion 105a. Between a stepped portion 111 formed with a shank portion 109a of the bolt 109 and the shank portion 105a is supported a ball bearing 113.

A line roller 115 having a line guide 115a cylindrically shaped except opposite ends thereof is rotatably supported between the bail arm 103 and the line slider 105 through the ball bearing 113.

Similarly to the embodiment illustrated in FIG. 1, each of the bail arm 103 and the line slider 105 is integrally formed at each of their distal ends along a longitudinal axis of the line roller 43 with projections 117 and 119, respectively. The projections 117 and 119 have a substantially triangle cross-section, and are in facing relation to each other. The projection 117 of the bail arm 103 projects towards the line slider 105, passing across the center of the line roller 115. To each of tip ends of the projections 117 and 119 is secured the controllers 65 and 67, respectively, so that the controllers are in parallel with each other. These controllers 65 and 67 work as a first control section 121 which controls a line path through which the fishing line 51 is to be guided from a distal end of a fishing rod to the line roller 115, similarly to the above mentioned first control section 68.

In addition, each of the bail arm 103 and the line slider 105 is integrally formed at an opposite side to the projections 117 and 119 with respect to the line roller 115 along a longitudinal axis of the line roller 43 with projections 123 and 125, respectively. The projections 123 and 125 have a substantially triangle cross-section, and are in facing relation to each other. The projection 125 of the line slider 105 projects towards the bail arm 103, passing across the center of the line roller 115. To each of tip ends of the projections is secured the controllers 73 and 75, respectively. These controllers 73 and 75 work as a second control section 127 which controls a line path through which the fishing line 51 is to be guided from the line roller 115 to the spool 47, similarly to the above mentioned second control section 76.

Accordingly, as illustrated in FIG. 9, the first control section 121 is disposed closer to the line winding direction of the rotor 35 (namely, a direction indicated with an arrow C in FIG. 9) than the second control section 127.

In the embodiment having the above mentioned structure, by swinging the bail 41 to the line winding side after the lure has been thrown away, the fishing line 51 is guided to the projections 117,119, 123 and 125, and then further guided to the line roller 115 through the controllers 65, 67, 73 and 75.

Then, by handling the manual handle 49 to attempt to wind the fishing line 51 up, the fishing line 51 is wound around the spool 47 which is making a traverse movement in response to the winding up of the fishing line. During this operation, though the fishing line 51 tends to move towards a side (namely, a direction indicated with an arrow D in FIG. 9) opposite to the line winding direction of the rotor 35, the controller 65 comes to in contact with the fishing line 51 guided by the line roller 115, and restricts such movement of the fishing line.

In addition, since the first control section 121 is disposed closer to the line winding direction of the rotor 35 than the second control section 127 in the embodiment, the fishing line 51 comes to in oblique contact with the line guide 115a of the line roller 115, as having been illustrated in FIG. 4.

Accordingly, as the fishing line 51 is wound around the spool 47, the fishing line 51 in contact with the line guide 115a of the rotating line roller 115 attempts to move in a direction indicated with an arrow F in FIG. 4, that is, in a direction towards the line slider 115.

However, the controllers 67 and 75 of the first and second control sections 121 and 127, respectively, come in contact with the fishing line 51, and thereby restrict the movement of the fishing line in a direction indicated with an arrow F. Thus, a counter-force causes the fishing line 51 to be twisted in a direction indicated with an arrow G, and the fishing line 51 is wound around the spool 47 under such a condition.

The line twist in a direction indicated with an arrow G is just opposite to a direction of the line twist (namely, a direction indicated with an arrow E in FIG. 12) to be caused when the fishing line is thrown away.

As a diameter of a roll of the fishing line wound around the spool 47 becomes greater by winding the fishing line 51 around the spool, a force for moving the fishing line 51, which attempts to move in a direction indicated with an arrow F, in a direction indicated with an arrow D. However, the controllers 65 and 73 of the first and second control sections 121 and 127 come in contact with the fishing line 51, and thereby restrict the movement of the fishing line in a direction indicated with an arrow D.

Accordingly, while the fishing line is being wound, the fishing line 51 is controlled by the first and second control sections 121 and 127 to thereby be always placed in a predetermined position of the line roller 115. In addition, line twist occurs in a direction (namely, a direction indicated with an arrow G) opposite to a direction of the line twist (namely, a direction indicated with an arrow E in FIG. 12) which occurs when the fishing line is to be thrown away, and the fishing line is wound around the spool 47 under such a condition.

Thus, the line twist of the fishing line 51 wound around the spool 47 is eliminated by being canceled with the line twist which is to occur when the fishing line is thrown away.

As having been described so far, the embodiment resolves the problems of the conventional spinning reel for fishing as illustrated in FIGS. 11 to 16, and causes the fishing line 51, without being influenced by a diameter of a roll of the wound fishing line, to have the line twist in a direction opposite to a direction of the line twist which occurs when the fishing line is to be thrown away. Thus, line twist is never accumulated in the fishing line 51.

Thus, in accordance with the present embodiment, there does not occur entanglement of the fishing line caused due to twisting of the fishing line 51, and there is no fear that the fishing line 51 is broken down due to a long use thereof, resulting in much enhancement of practicality of the spinning reel for fishing.

In addition, in the present embodiment, the first and second control sections 121 and 127 restrict movement of the fishing line 51 even if a diameter of a roll of the fishing line 51 wound around the spool 47 varies to a greater or smaller one, and thus the fishing line 51 is not shaken on the line roller 115.

In addition, since the line roller 115 is rotatably supported through the ball bearing 113 in the embodiment, the embodiment has an advantage relative to the above mentioned embodiments that the winding up operation of the line roller 115 can be carried out more readily.

Figure 17:
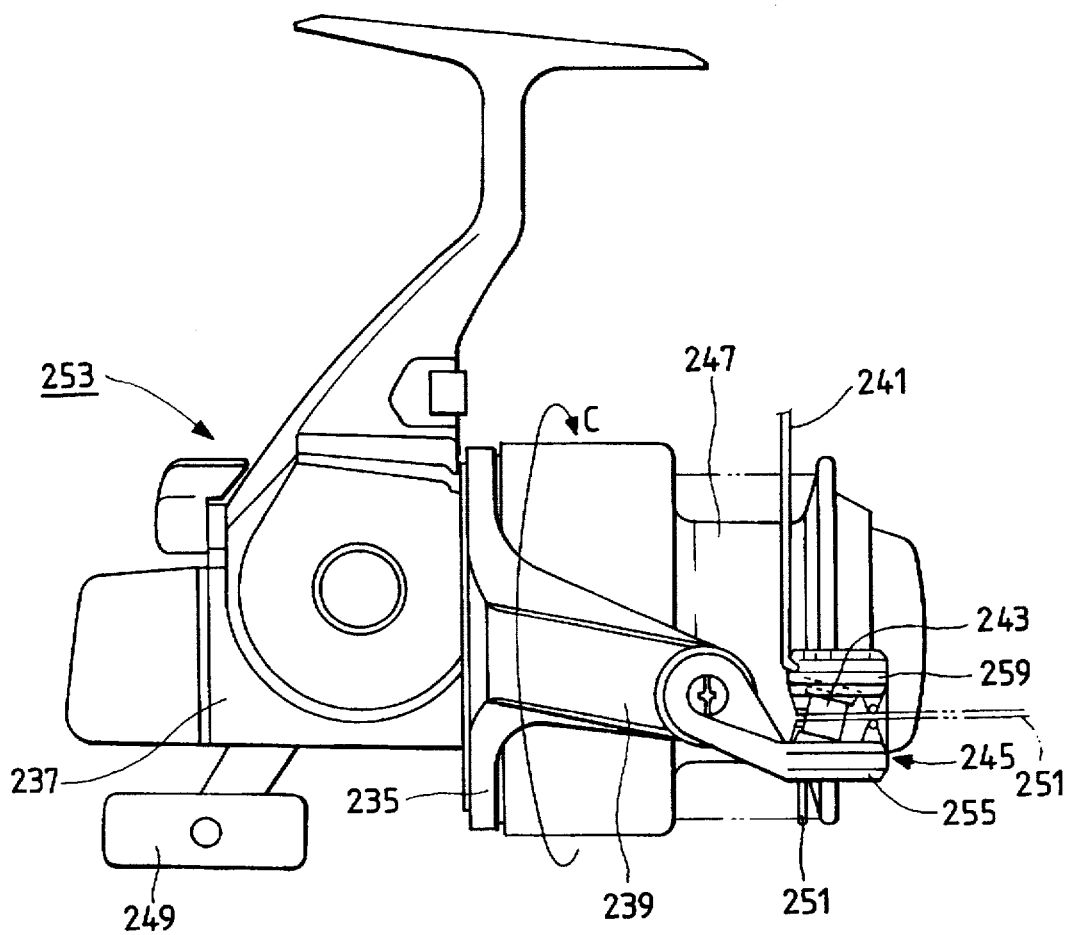
FIG. 17 is a side view of a spinning reel for fishing in accordance with a fifth embodiment of the present invention.
Figure 18:
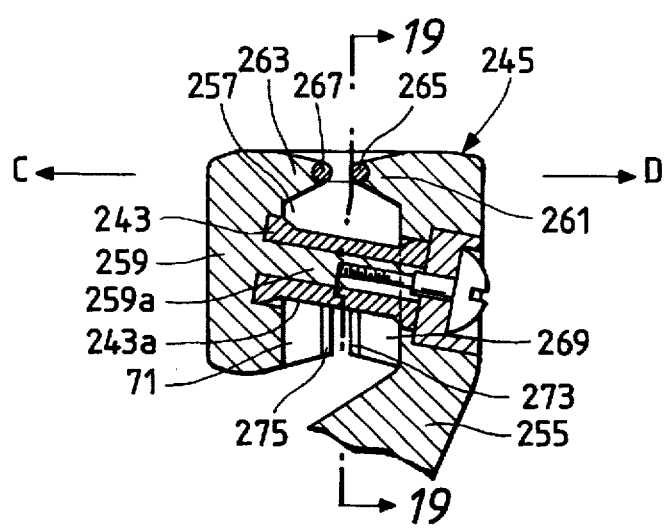
FIG. 18 is a cross-sectional view of the spinning reel for fishing illustrated in FIG. 17.
Figure 19:
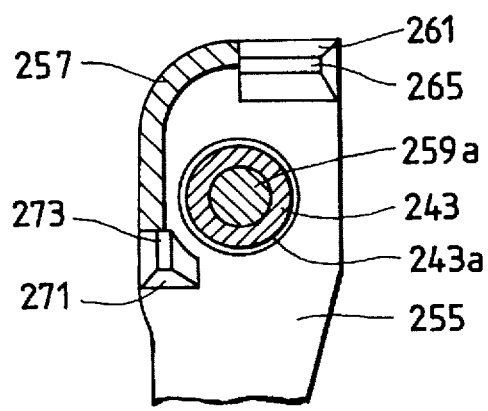
FIG. 19 is a cross-sectional view taken along the line 19—19 of FIG. 18.

FIGS. 17 to 19 illustrate a spinning reel for fishing according to a fifth embodiment of the present invention. FIG. 17, a reference numeral 235 indicates a rotor rotatably secured to a reel main body 237. The rotor 235 is integrally formed with a pair of bail support arms 239 projecting towards a distal end of a fishing rod. To the bail support arm 239 at their distal ends is secured a half-annular shaped bail 241 through a bail holder (not illustrated) and a support member 245 for supporting a line roller 243 so that the bail 241 can be swung to a side for winding a fishing line and also to a side for throwing away a fishing line.

A reference numeral 247 indicates a spool coaxial with respect to the rotor 235. The spool 247 is carried by a spool shaft (not illustrated) secured to the reel main body 237 so that the spool shaft can make a traverse movement. Similarly to a conventional spool, by swinging the bail 241 to the line winding side and rotating the rotor 235 in a line winding direction (namely, a direction indicated with an arrow C) with a manually operated handle 249, a fishing line 251 is wound around the spool 247 making a traverse movement in response to the rotation of the rotor 235.

A spinning reel 253 in accordance with the embodiment has the following features in addition to the structure of the conventional reel as mentioned above.

The support member 245 for supporting the line roller 243 comprises a bail arm 255 swingably secured to the bail support arm at its distal end, and a line slider 259 having a T-shaped cross-section and integrally formed with the bail arm 255 through a line cover 257, as illustrated in FIGS. 18 and 19.

A shank portion 259a of the line slider 259 is fixedly secured to the bail arm 255 with a bolt. To the shank portion 259a is rotatably supported the line roller 243 including a line guide 243a having a cylindrical body except opposite ends thereof. As shown in FIG. 18, the shank portion 259a of the line slider 259 is shaped to extend obliquely backwardly toward the bail arm 255. Thus, the line roller 243 mounted to the shank portion 259a is supported obliquely so that its end located at the side of the fishing line winding direction (the direction indicated by arrow C in the drawing) of the rotor 235 is nearer to the distal end of the fishing rod.

As illustrated in FIGS. 18 and 19, each of the bail arm 255 and the line slider 259 is integrally formed at each of their distal ends with inward projections 261 and 263, respectively. Cylindrically shaped or rod-like controller 265 and 267 made of ceramics are secured to respective tip ends in parallel relation to each other. These controller 265 and 267 contact the fishing line 251 to be guided to the line roller 243 during the winding operation for the line roller 251 to restrict the movement of the fishing line 251 and to position the fishing line 251 at the substantially central portion of the line roller 243.

In addition, each of the bail arm 255 and the line slider 259 is integrally formed at an opposite side to the projections 261 and 263 with respect to the line roller 243 with inward projections 269 and 271, respectively. The projections 269 and 271 have a substantially triangular cross-section, and are in facing relation to each other. Cylindrically shaped controllers 273 and 275 are secured to respective tip ends of the projections 269 and 271, each made of the same material as that of the controllers 265 and 267.

The controllers 273 and 275 restrict the movement of the fishing line 251 contacting the fishing line guide portion 243a of the line roller 243 in the axial direction of the line roller 243 when the fishing line 251 is wound up, and position the fishing line 251 at the substantially central portion of the line roller 243.

In addition, the above-mentioned projection 271 is formed into the substantially triangular shape in section, and is designed to have such a inclined configuration as to smoothly guide the fishing line 51 to the line roller 243 when the bail 241 is inverted from the fishing line feed-out position to the fishing line winding-up position. However, the projection 271 may be formed into any shape as long as it can smoothly transfer the fishing line 251 to the line roller 243.

A line roller is in general composed of hard material such as various ceramics and copper alloy to which hard plating is applied. The line roller 243 in the embodiment is also composed of such hard material. The controllers 265, 267, 273 and 275 may be selectively composed of various hard materials such as copper alloy to which hard plating is applied, aluminum to which hard alumite or hard plating is applied, and stainless steel to which ion plating is applied, as well as ceramics. However, the material of which the controllers are made is not to be limited to those.

In the embodiment having the above mentioned structure, when a lure is thrown away with the bail 241 being swung to the line throwing side, the fishing line 251 wound around the spool 247 is fed out in a spiral way. Then, by swinging the bail 241 to the line winding side, the fishing line 251 is guided by the projections 261, 263, 269 and 271 so that it is positioned at the substantially central portion of the line roller 243.

Then, by handling the manual handle 249 to wind the fishing line 251 up, the fishing line 251 is wound around the spool 247 which is making a traverse movement in response to the winding up of the fishing line. During this operation, though the fishing line 251 tends to move in the line winding direction of the rotor 35 (i.e. the direction indicated by C in FIG. 18) due to the inclined arrangement of the fishing line guide portion 243a of the line roller 243, the controllers 267 and 275 comes in contact with the fishing line 251 guided by the line roller 243, and restricts such movement of the fishing line.

That is to say, since the line roller 243, as noted above, is designed to be inclined so that its end located at a side of fishing line winding direction (indicated by C in the drawing) of the rotor 235 is nearer to the distal end of the rod as shown in FIG. 18, the fishing line 251 contacting the fishing line guide portion 243a of the rotating line roller 243 attempts to move in the direction indicated by arrow F, namely toward the line slider 259 which is located at the side of the fishing line winding direction as the fishing line 247 is wound up onto the spool 247.

Figure 20:
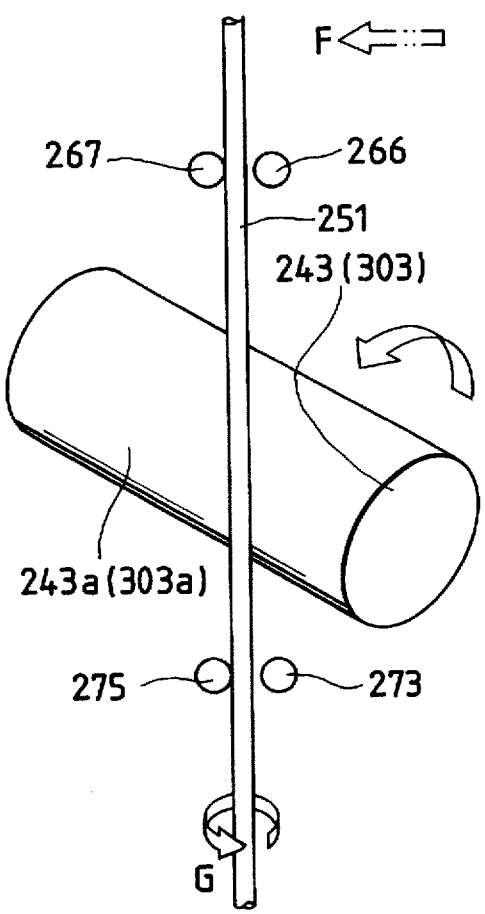
FIG. 20 is an explanatory view for showing the reason why a fishing line is twisted.
Figure 21:
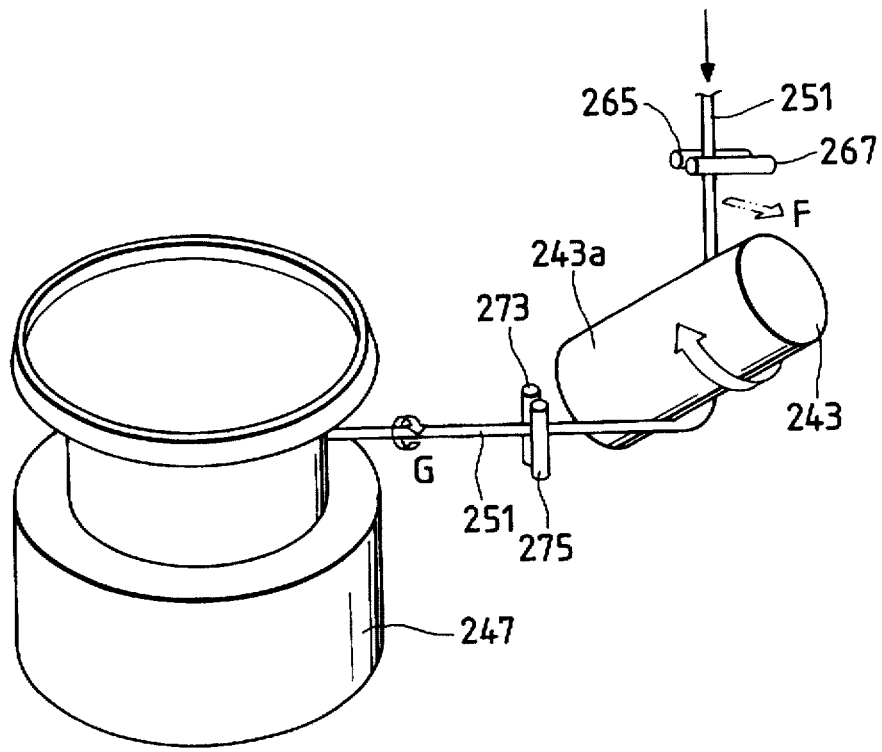
FIG. 21 is an explanatory view for showing the reason why a fishing line is twisted.

However, as shown in FIGS. 20 and 21, the controllers 267 and 275 located at the line slider (259) side contact the fishing line 251 and restrict the movement in the arrow (F) direction, and consequently the line twist in the arrow (G) direction is produced on the fishing line 251 due to its reaction, and the fishing line 251 is wound up onto the spool 251 with such twist. This twist in the arrow (G) direction is opposite relative to the twist of the fishing line in the direction indicated by E in FIG. 16, which is to be produced during casting, and thus disappears by being canceled by the twist produced during casting.

If the diameter of the fishing line wound up on the spool 247 is made large as the fishing line 251 is wound up, a force acts on the fishing line 251 which attempts to move in the arrow (F) direction, so as to move the fishing line 251 in the arrow (D) direction. However, the controllers 265 and 273 on the bail arm (255) side contact the fishing line 251 and restrict the movement of the fishing line 251 in the arrow (D) direction.

Therefore, during the fishing line winding-up operation, the fishing line 251 is always positioned at the substantially central portion of the line roller 243, and is wound up onto the spool 247 with the line twist in the direction indicated by G opposite to the line twist (indicated by E in FIG. 16) which is to be produced by the casting.

In addition, the provision of at least the controllers 267 and 275 on the line slider (259) side suffices in order to produce the line twist on the fishing line 251 in the direction opposite from the line twist to be produced when the fishing line is fed out during casting.

As having been described so far, the embodiment resolves the problems of the conventional spinning reel for fishing as illustrated in FIGS. 11 to 16, and causes the fishing line 251, without being influenced by a diameter of a roll of the wound fishing line, to have the line twist in a direction opposite to a direction of the line twist which occurs when the fishing line is to be thrown away. Thus, line twist is never accumulated in the fishing line 251.

Thus, in accordance with the present embodiment, there does not occur entanglement of the fishing line caused due to twisting of the fishing line 251, and there is no fear that the fishing line 251 is broken down due to a long use thereof, resulting in much enhancement of practicality of the spinning reel for fishing.

In addition, in the present embodiment, the first and second controllers 265, 267, 273 and 275 contact the fishing line 251 and restrict the movement of the fishing line 251 even if a diameter of a roll of the fishing line 251 wound around the spool 247 varies between greater or smaller one, and thus the fishing line 251 is not loose on the line roller 243.

Figure 22:
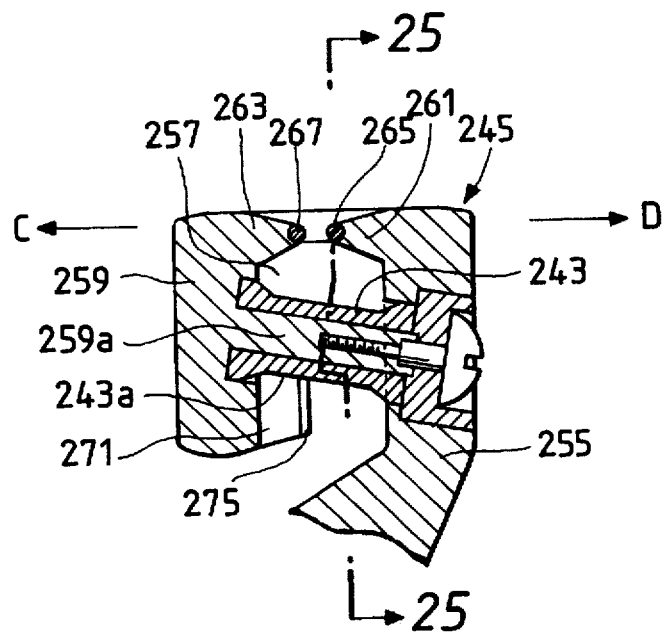
FIG. 22 is a cross-sectional view of a spinning reel for fishing in accordance with a sixth embodiment of the present invention.
Figure 23:
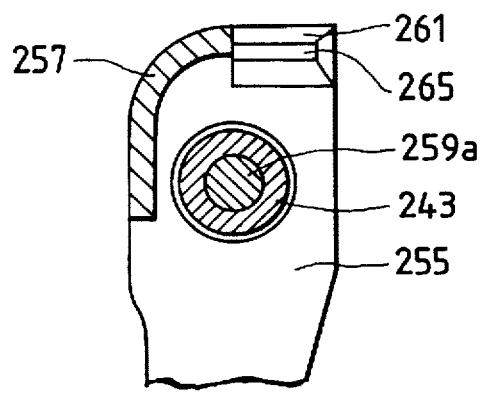
FIG. 23 is a cross-sectional view taken along the line 23—23 of FIG. 22.

FIGS. 22 and 23 illustrate a spinning reel for fishing in accordance with a sixth embodiment of the present invention. The controller 273 is fixedly secured to the projection 269 formed on the bail arm 255 to restrict the movement of the fishing line 251 in the arrow (D) direction during the winding-up operation in the above mentioned fifth embodiment, while, in this embodiment, the projection 269 and the controller 273 are dispensed with.

This embodiment has substantially the same structure as that of the above mentioned embodiment, and hence the same parts as those of the above mentioned embodiment have been provided with the same reference numerals and will not be explained.

In the embodiment, as a diameter of a roll of the fishing line 251 wound around the spool 247 becomes greater by winding the fishing line 251 around the spool, a force for moving the fishing line 251, which attempts to move towards the line slider 259 (namely, in a direction indicated with an arrow F in FIG. 20), in a direction indicated with an arrow D. However, the controller 265 on the bail arm (255) side comes in contact with the fishing line 251, and thereby restrict the movement of the fishing line in a direction indicated with an arrow D. Even if the fishing line 251 in contact with the line guide 243a of the line roller 243 is moved in a direction indicated with an arrow D, the fishing line 251 finally moves towards the line slider 259 (namely, in a direction indicated with an arrow F in FIG. 20) along the line guide 243a.

Then, since the controllers 267 and 275 on the line slider (259) side come to in contact with the fishing line 251 and thereby restrict the movement of the fishing line 251, a counter-force or reaction causes the fishing line 251 to have the line twist in a direction (namely, a direction indicated with an arrow G) opposite to a direction of the line twist (namely, a direction indicated with an arrow E in FIG. 16) which occurs when the fishing line is to be thrown away, similarly to the above mentioned embodiments.

As having been described so far, even if the controller 273 disposed at the side of the bail arm 255 is omitted, it is possible to cause the fishing line 251, without being influenced by a diameter of a roll of the wound fishing line, to have the line twist in a direction opposite to a direction of the line twist which occurs when the fishing line is to be thrown away, and thus this embodiment is also free from the line twist accumulation.

Thus, in accordance with the present embodiment, entanglement of the fishing line caused due to twisting of the fishing line 251, does not occur and there is no problem that the fishing line 251 breaks down due to a long use thereof, resulting in enhancement of practicality of the spinning reel for fishing.

Figure 24:
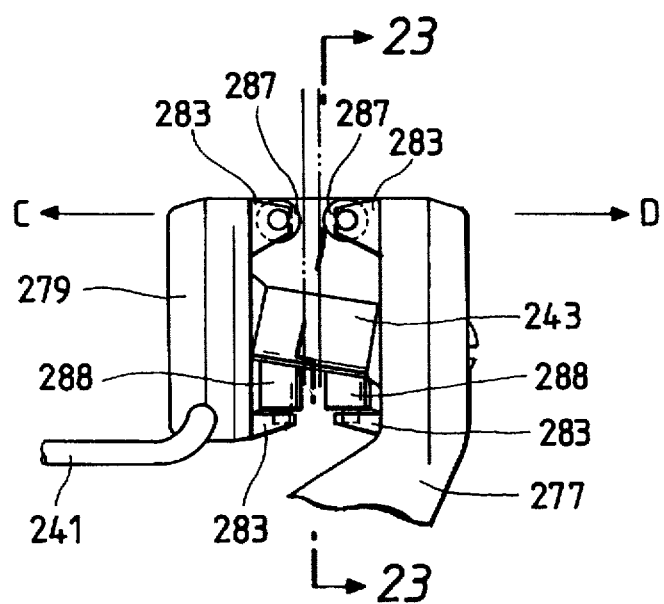
FIG. 24 is a plan view of a spinning reel for fishing in accordance with a seventh embodiment of the present invention.
Figure 25:
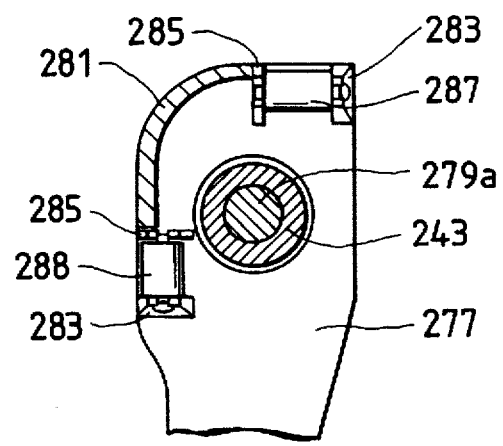
FIG. 25 is a cross-sectional view taken along the line 25—25 of FIG. 24.

FIGS. 24 and 25 illustrate a spinning reel for fishing in accordance with a seventh embodiment of the present invention.

This embodiment has the same structure as the above-mentioned fifth embodiment illustrated except the inventive structure. Accordingly, hereinbelow will be described only the inventive structure. The same parts as those of the above mentioned embodiment have been provided with the same reference numerals and will not be explained.

In FIG. 24, a reference numeral 277 indicates a bail arm, which is similar to the bail arm 255, secured to the bail support arm 239 at its distal end, and a reference numeral 279 indicates a line slider having a T-shaped cross-section and formed integrally with the bail arm 277 through a line cover 281. The line slider 279, as similarly to the line slider 259, is formed with a shank portion 279a extending obliquely backwardly toward the basil arm 277. The line roller 243 is rotatably carried at the shank portion 279a of the line slider secured to the bail arm 277 by means of a bolt. As similarly to the above-mentioned embodiments, the line roller 243 is supported obliquely so that the end of the line roller 243 located at the side of the fishing line winding-up direction (indicated by C in the drawing) of the rotor 235 is nearer to the distal end of the fishing rod.

In place of the projections 261, 263, 269 and 271 and the controller 265, 267, 273 and 275 for restricting the movement of the fishing line 251 in the fifth embodiment, the bail arm 277 and the line slider 279 of this embodiment has pairs of roller supporting pieces 283 and 285 which face with each other and are raised up at the same positions of the projections 261, 263, 269 and 271, and rollers 287 and 288 which are rotatably supported between the roller supporting pieces 283 and 285 of respective pairs so as to function as a controller for restricting the movement of the fishing line 251.

Thus, the present embodiment is able to accomplish the desired object, similarly to the first embodiment. Since this embodiment uses the rotatable rollers 287 and 288 as the controller, the embodiment makes it possible to guide the fishing line 251 to the line roller 243 and the spool 247 without imposing excessive load to the fishing line 251 relative to the above mentioned embodiments.

Accordingly, the embodiment has an advantage relative to the above mentioned embodiments that the embodiment provides a better countermeasure against the line twist.

Figure 26:
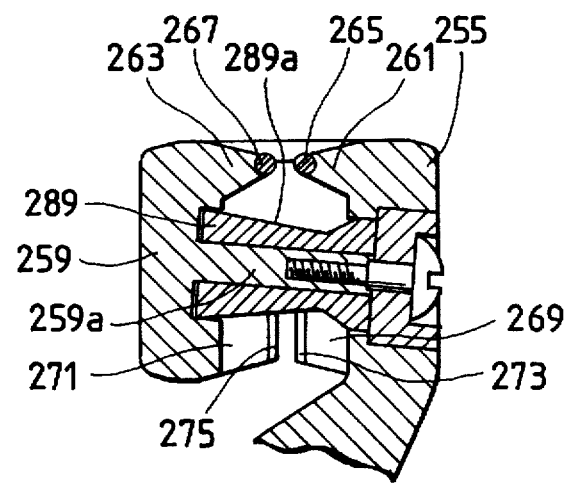
FIG. 26 is a cross-sectional view of a spinning reel for fishing in accordance with an eighth embodiment of the present invention.

FIG. 26 shows a spinning reel for fishing according to an eighth embodiment of the present invention. In place of the line roller 243 of the embodiment shown in FIG. 17, this embodiment uses a line roller 289 designed such that the fishing line guide portion 289 with the exception of its both ends are gradually enlarged in diameter in the direction from the bail arm (255) side to the line slider (259) side, i.e. in the fishing line winding-up direction (indicated by arrow C in the drawing) of the rotor 235 to present a tapered configuration. The line roller 289 is rotatably supported on the shank portion 259a of the line slider 259 in such an inclined manner that the end of roller 289 located at the side of the fishing line winding-up direction of the rotor 235 is closer to the distal end of the fishing rod.

In addition, other structure is the same as that of the embodiment shown in FIG. 17, so that the same reference numerals are applied to the corresponding components and the detailed description therefor is omitted here.

According to this embodiment, since the line roller 289 is formed so that its fishing line guide portion 289a is gradually enlarged in diameter in the fishing line winding-up direction of the rotor 235 to present the tapered configuration, the frictional resistance between the line roller 289 and the fishing line 251 becomes larger at the diameter larger side of the line roller 289, and consequently the fishing line 251 is wound up onto the spool 247 with the formation of the line twist.

This line twist is oriented in the direction opposite from the direction (indicated by E in FIG. 16) of the line twist to be produced during casting, and the line twist thus formed disappears through mutual cancellation when the fishing line is fed out.

As noted above, the present embodiment also has the advantage that there is produced the line twist on the fishing line 251 in the direction opposite from the direction of the line twist to be produced during casting.

Figure 27:
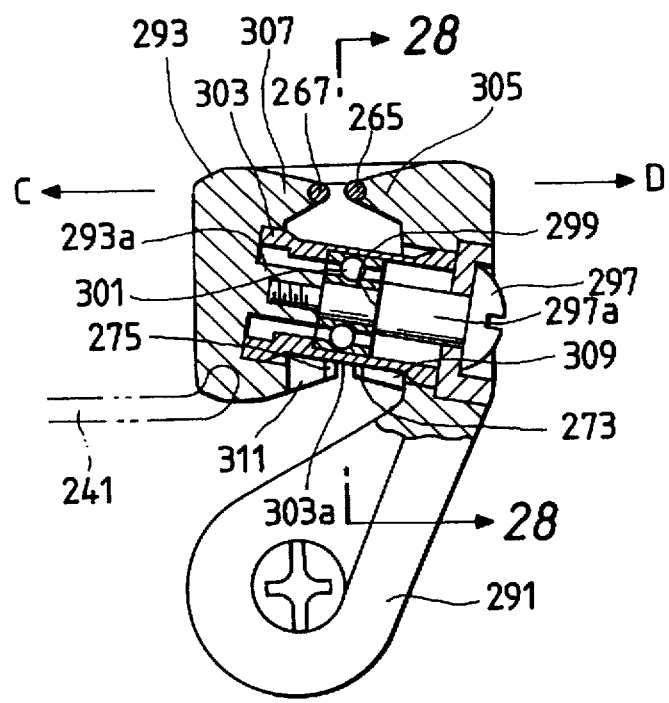
FIG. 27 is a cross-sectional view of a spinning reel for fishing in accordance with a ninth embodiment of the present invention.
Figure 28:
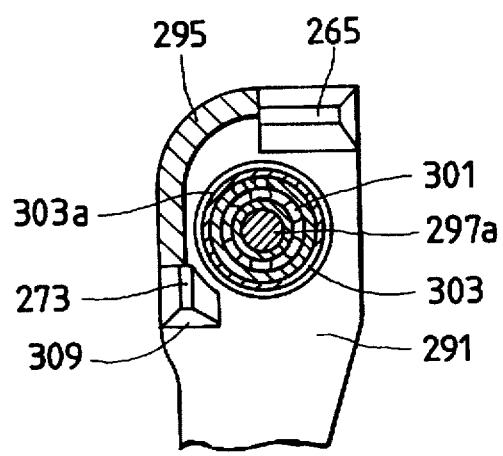
FIG. 28 is a cross-sectional view taken along the line 28—28 of FIG. 27.

FIGS. 27 and 28 illustrate a spinning reel for fishing in accordance with a ninth embodiment of the present invention. In this embodiment, the line roller is rotatably supported by using a ball bearing.

Hereinbelow will be explained the embodiment with reference to the drawings. Parts which are the same as those of the above mentioned embodiments have been provided with the same reference numerals, and thus will not be explained.

In the drawings, reference numeral 291 designates a bail arm which is mounted on the distal end of the bail support arm 239, and reference numeral 293 designates a line slider which is molded integral with the bail arm 291 though the line cover 295. The line slider 293 is provided with the shank portion 293a which is short in length in comparison with the above-mentioned shank portion 259a of the line slider 259 and which extends obliquely backward toward the bail arm 255. The shank portion 293a is connected to the bail arm 291 through a bolt 297 passing through the bail arm 291 and arranged coaxially with respect to the shank portion 293a such that a bearing 301 is interposed between a distal end of the shank portion 293a and a step portion 299 provided on the shank portion 297a of the bolt 297.

A line roller 303 having a fishing line guide portion 303a formed into the cylindrical configuration with the exception of its both ends is rotatably supported through the ball bearing and located between the bail arm 291 and the line slider 293. The line roller is arranged obliquely so that the end of the line roller 303 located at the side of fishing line winding-up direction (indicated by C in the drawing) of the rotor 235 is closer to the distal end of the fishing rod.

As similarly to the embodiment shown in FIG. 17, the bail arm 291 and the line slider 293 are integrally formed at their leading ends with inward projections 305 and 307 facing together and each having a triangular shape in section. The controller 265 and 267 each made of ceramics and each in the form of a cylindrical rod are fixedly secured to apexes of the projections so that they are parallel to each other. The controllers 265 and 267 contact the fishing line 251 being guided to the line roller 303 and restrict the movement thereof to position the fishing line 251 at the substantially central portion of the line roller 303.

Since this embodiment is constructed as mentioned above, when the bail 241 is inverted to the fishing line winding-up position after casting, the fishing line is guided by the projections 305, 307, 309 and 311 and positioned at the substantially central portion of the line roller 303 by the controllers 265, 267, 273 and 275.

If the fishing line 251 is wound up in this condition by operating manually-operated handle 249, then the fishing line 251 is wound up onto the spool 247 making the traverse motion in association with the operation of the handle. During this operation, the fishing line 251 positioned at the substantially central portion of the line roller 103 attempts to move in the fishing line winding-up direction of the rotor 235 (i.e. the direction indicated by C in FIG. 27), but the controllers 267 and 275 contact the fishing line 251 guided by the line roller 303 and restrict such movement.

That is to say, since the line roller 303 in the present embodiment is also designed to be inclined so that its end located at a side of fishing line winding direction of the rotor 235 is nearer to the distal end of the rod, as similarly to the embodiment shown in FIG. 17, the fishing line 251 contacting the fishing line guide portion 103a of the rotating line roller 303 attempts to move in the direction indicated by arrow F of FIG. 20, namely toward the line slider 293 which is located at the side of the fishing line winding direction as the fishing line 251 is wound up onto the spool 247.

However, the controllers 267 and 275 located at the line slider (293) side contact the fishing line 251 and restrict the movement in the arrow (F) direction, and consequently the line twist in the arrow (G) direction is produced on the fishing line 251 due to its reaction as shown in FIG. 20, and the fishing line 251 is wound up onto the spool 247 with such twist. This twist in the arrow (G) direction is opposite relative to the twist of the fishing line in the direction indicated by E in FIG. 16, which is to be produced during casting, and thus disappears by being canceled by the twist produced during casting.

If the diameter of the fishing line wound up on the spool 247 is made large as the fishing line 251 is wound up, a force acts on the fishing line 251, which attempts to move in the arrow (F) direction, so as to move the fishing line 251 in the arrow (D) direction. However, the controllers 265 and 273 on the bail arm (291) side contact the fishing line 251 and restrict the movement of the fishing line 251 in the arrow (D) direction.

Therefore, during the fishing line winding-up operation, the fishing line 251 is always positioned at the substantially central portion of the line roller 303, and is wound up onto the spool 247 with the line twist in the direction indicated by G opposite to the direction of the line twist (indicated by E in FIG. 16) which is to be produced by the casting.

As it has been described so far, the embodiment resolves the problems of the conventional spinning reel for fishing as illustrated in FIGS. 11 to 16, and causes the fishing line 251, without being influenced by a diameter of a roll of the wound fishing line, to have the line twist in a direction opposite to a direction of the line twist which occurs when the fishing line is to be thrown away. Thus, line twist is never accumulated in the fishing line 251.

Thus, in accordance with the present embodiment, entanglement of the fishing line caused due to twisting of the fishing line 251, does not occur and there is no problem that the fishing line 251 breaks down due to a long use thereof, resulting in much enhancement of practicality of the spinning reel for fishing.

Further, according to the present embodiment, even though the diameter of the fishing line 251 wound on the spool 247 varies from larger to smaller, each of the controllers 265, 267, 273 and 275 contact the fishing line 251 and restrict the movement thereof, so that the fishing line 251 is free from shifting on the line roller 303.

Furthermore, since the line roller 303 is rotatably supported through the ball bearing 301 in the present embodiment, more smooth fishing line winding-up operation can be carried out in comparison to the above-noted other embodiments.

Figure 29:
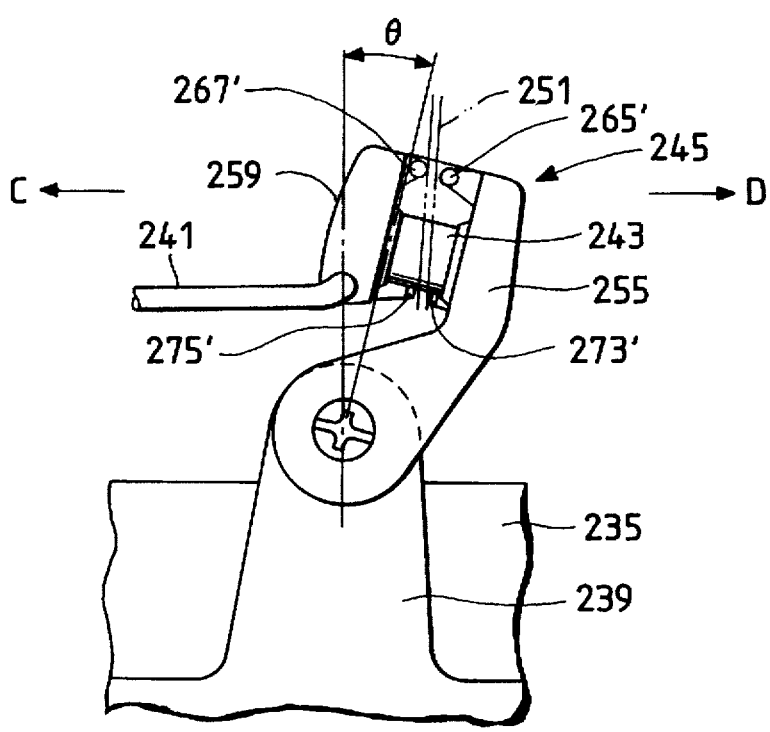
FIG. 29 is a side view of a spinning reel for fishing in accordance with a tenth embodiment of the present invention.

In each of the fifth to ninth embodiments, the shank portion 259a, 293a is provided on the line slider 259,293 in an inclined manner for tilting the line roller 243, 289, 303 with respect to the fishing line winding-up direction C of the rotor 235. However, the present invention can also be modified such that the bail support member 245 itself is inclined with a predetermined angle from a longitudinal axis when it is swung to the side for winding a fishing line, whereby the line roller 243, 289, 303 is inclined with respect to the fishing line winding-up direction C. For example, FIG. 29 shows a tenth embodiment of the present invention in which such modification is applied to the fifth embodiment.

In the tenth embodiment, in contrast to the fifth to ninth embodiments, a shank portion (not shown) as well as a line roller 243 extend orthogonal with respect to the line slider 259 and the bail arm 255, and the support member 245 is pivotably mounted on the bail support arm 239, and inclined with an angle θ from a rotational axis of the rotor 235 when it is located at the side for winding the fishing line. By this arrangement, the shank portion can support the line roller 243 in such an inclined manner with respect to the fishing line winding-up direction C that a left hand side end of the line roller 243 is closer to the distal end of the fishing rod than the right hand side end of the line roller 243.

In the tenth embodiment, the controller 265' is located closer to the line slider 259 than the controller 273'. Similarly, the controller 275' is located closer to the bail arm 255 than the controller 267'.

In addition, the controller 265' for restricting movement of the fishing line 251 extending from the distal end of the fishing rod to the line roller 243 may be located closer to the line slider 259 than the controller 275' for restricting movement of the fishing line 251 extending from the line roller 243 to the spool 247, to thereby more positively contact the fishing line 251 with the line roller 243 in the inclined manner.

Since the structure of the tenth embodiment also permits inclinably contacting the fishing line 251 with the line roller 243 as similarly to the first to ninth embodiments, the similar advantages can be obtained.

A spinning reel for fishing including a bail as explained in the above mentioned embodiments usually uses a bail arm for supporting a line roller. However, there have existed many spinning reels for fishing not having such a bail.

In such spinning reels, a rotor is provided with a support member corresponding to the above mentioned bail arm, and a line roller is carried by the support member. The invention can be applied to such spinning reels.

As having been described so far, when a fishing line is to be wound up, the spinning reel for fishing in accordance with the present invention is able to cause a fishing line, without being influenced by a diameter of a roll of wound fishing line, to have line twist in a direction opposite to a direction of line twist which occurs when a fishing line is to be thrown away. Thus, line twist is never accumulated in a fishing line.

Thus, there does not occur entanglement of a fishing line, which is caused due to twisting of a fishing line, in winding up a fishing line and also in feeding out a fishing line, and there is no fear that a fishing line is broken down due to a long use thereof, resulting in much enhancement of practicality of the spinning reel for fishing.

What is claimed is:

1. A spinning reel for fishing comprising:

a rotor rotatably attached to a reel main body;

a spool carried by said reel main body through a spool shaft so that a fishing line can be wound around said spool by rotating said rotor in a fishing line winding-up direction with a manually operated handle; and a line roller secured to said rotor through a support member for guiding said fishing line from a distal end of a fishing rod to said spool during an operation for winding said fishing line, wherein:

said support member includes:

a first control section for controlling a line path of said fishing line extending from said distal end of said fishing rod to said line roller; and a second control section for controlling a line path of said fishing line extending from said line roller to said spool;

said first control section is disposed offset from said second control section in a direction parallel to said fishing line winding-up direction of said rotor;

said support member includes a bail arm pivotably secured to a bail support arm provided on said rotor, and a line slider disposed in facing relation to said bail arm for supporting said line roller in cooperation with said bail arm;

said first control section includes a first controller secured to a distal end of a projection projecting from said bail arm towards said line slider along an axis of said line roller, and a second controller secured to a distal end of a projection projecting from said line slider towards said bail arm and facing said first controller; and said second control section includes a third controller secured to a distal end of a projection projecting from said line slider towards said bail arm along said axis of said line roller.

2. The spinning reel for fishing according to claim 1, wherein:

said second control section further includes a forth controller secured to a distal end of a projection projecting from said bail arm towards said line slider and facing said third controller.

3. A spinning reel for fishing comprising:

a rotor rotatably arranged with respect to a reel main body;

a spool supported on said reel main body so that a fishing line can be wound around said spool by rotating said rotor in a fishing line winding-up direction; and a line roller supported on said rotor through a support member for guiding said fishing line from a distal end of a fishing rod to said spool during an operation for winding said fishing line, said line roller having a first end and a second end opposite from said first end with respect to said fishing line winding-up direction; wherein:

said fishing reel further comprises means for inclinably contacting said fishing line with said line roller;

said means includes at least one of:

(1) a pair of first and second controllers, said first controller projecting from a proximity of said first end toward said second end along an axis of said line roller for restricting movement of said fishing line extending from said distal end of said fishing rod to said line roller while contacting said fishing line, said second controller projecting from a proximity of said second end toward said first end along an axis of said line roller for restricting movement of said fishing line extending from said line roller to said spool while contacting said fishing line, and a distal end of said first controller being closer to said second end than a distal end of said second controller; and (2) a support shaft provided on said support member for supporting said line roller in such an inclined manner with respect to said fishing line winding-up direction that said second end is closer to said distal end of said fishing rod than said first end.

4. A spinning reel for fishing comprising:

a rotor rotatably arranged with respect to a reel main body;

a spool supported on the reel main body and onto which a fishing line can be wound by rotating said rotor in a winding direction during a fishing line winding operation; and means, comprising a line roller secured to said rotor through a support member, for feeding the fishing line to said spool during the winding operation in such a manner that the fishing line twists about its own lengthwise axis in a direction opposite to a direction of twist imparted to the fishing line in a fishing line;

wherein said feeding means further comprises means for forcing the fishing line to contact and pass over said line roller at a fixed, oblique angle relative to a principal axis of said line roller.

5. A spinning reel for fishing according to claim 4, wherein:

said feeding means further comprises means for restricting movement of the fishing line in an axial direction of said line roller.

6. A spinning reel for fishing according to claim 4, whereby: the twist imparted to the fishing line by said feeding means during the winding operation substantially cancels the twist imparted to the fishing line in the casting operation.

7. A spinning reel for fishing comprising:

a rotor rotatably attached to a reel main body;

a spool carried by said reel main body through a spool shaft so that a fishing line can be wound around said spool by rotating said rotor in a fishing line winding-up direction with a manually operated handle; and a line roller secured to said rotor through a support member for guiding said fishing line from a distal end of a fishing rod to said spool during an operation for winding said fishing line, wherein:

said support member includes:

a first control section for controlling a line path of said fishing line extending from said distal end of said fishing rod to said line roller; and a second control section for controlling a line path of said fishing line extending from said line roller to said spool;

said first control section is disposed offset from said second control section in a direction parallel to said fishing line winding-up direction of said rotor; and said first control section and said section control section force the fishing line to contact and pass over said line roller at a fixed, oblique angle relative to a principal axis of said line roller.

8. A spinning reel for fishing according to claim 7, wherein:

said first control section contacts said fishing line exclusively at line path locations located between said distal end of said fishing rod and a point of contact of said fishing line with said line roller; and said second control section contacts said fishing line exclusively at line path locations located between said point of contact of said fishing line with said line roller and said spool.

9. A spinning reel for fishing according to claim 8, wherein:

said first control section contacts said fishing line exclusively at line path locations located between said distal end of said fishing rod and an initial point of contact of said fishing line with said line roller during the operation for winding said fishing line; and said second control section contacts said fishing line exclusively at line path locations located between a final point of contact of said fishing line with said line roller during the operation for winding said fishing line and said spool.

10. A spinning reel for fishing according to claim 7, wherein:

said rotor rotates upstream in said fishing line winding-up direction during the operation for winding said fishing line; and said first control section is disposed upstream in said fishing line winding-up direction in relation to said second control section.

11. A spinning reel for fishing according to claim 10, wherein:

said line roller has an axial center dividing said roller into two substantially equal halves; and said first control section is disposed upstream of said axial center in said fishing line winding-up direction, and said second control section is disposed downstream of said axial center in said fishing line winding-up direction.

* * * * *